May 9, 1944. H. W. RUPPEL 2,348,363
TURRET INDEXING MECHANISM
Filed May 11, 1940 2 Sheets-Sheet 1
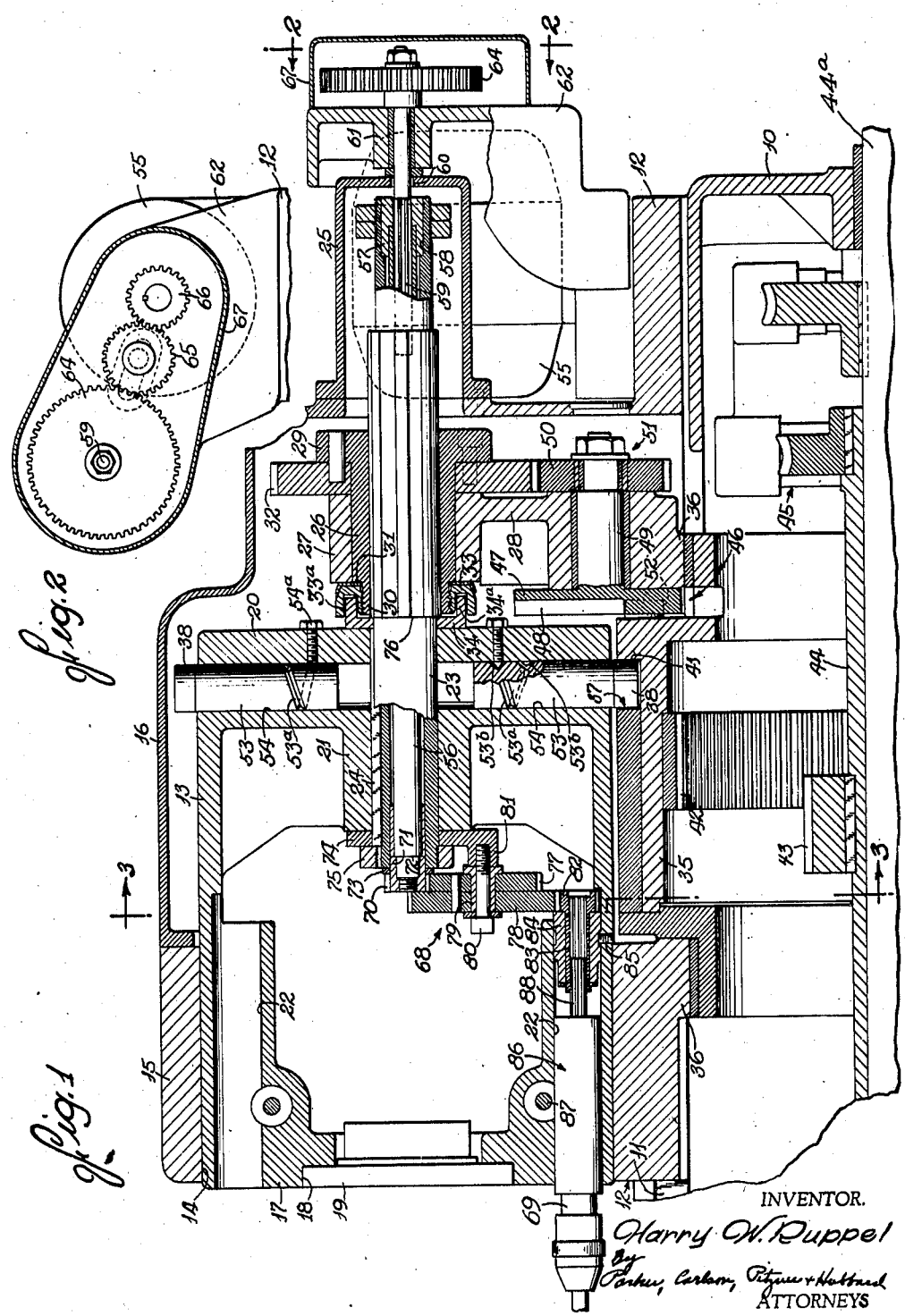
INVENTOR.
Harry W. Ruppel
By Parker, Carlson, Pitzner + Hubbard
ATTORNEYS

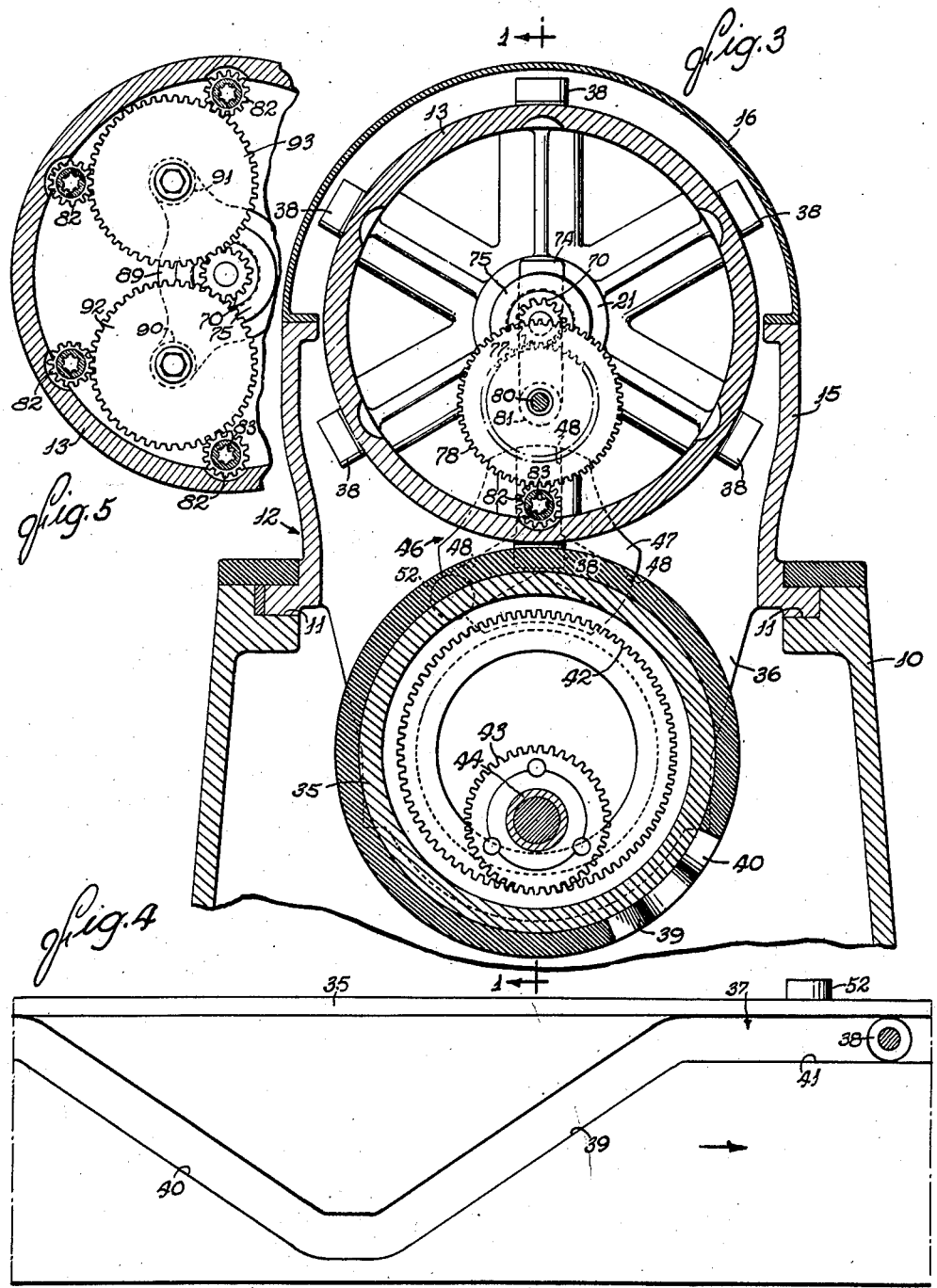

Patented May 9, 1944

2,348,363

UNITED STATES PATENT OFFICE 2,348,363

TURRET INDEXING MECHANISM

Harry W. Ruppel, Cleveland, Ohio, assignor to The Foote-Burt Company, Cleveland, Ohio, a corporation of Ohio Application May 11, 1940, Serial No. 334,625

7 Claims. (Cl. 29—40)

The present invention relates to improvements generally in turret machines and specifically in multiple spindle turrets adapted to be intermittently rotated to index successive spindles into a working station, and to be translated axially between successive indexing movements.

One object is to provide a new and improved high speed spindle driving attachment substantially enclosed inside the turret.

Further objects and advantages will become apparent as the description proceeds.

In the accompanying drawings, Figure 1 is a vertical axial sectional view taken substantially along line 1—1 of Fig. 3 through a turret with an indexing mechanism embodying the features of my invention.

Fig. 2 is a transverse vertical sectional view taken substantially along line 2—2 of Fig. 1.

Fig. 3 is a fragmentary sectional view taken substantially along the broken line 3—3 of Fig. 1 and showing a drive for a single rotary tool spindle.

Fig. 4 is a plan development of the cam drum for reciprocating the turret.

Fig. 5 is a fragmentary view similar to Fig. 3 but of a modified form showing a drive for a plurality of rotary tool spindles.

The turret, which is herein disclosed for purposes of illustration, is adapted for use in an automatic screw machine of the type wherein a bar of stock is fed intermittently through a hollow spindle and clamped in an automatic chuck, and is subjected to the successive operations of a plurality of cutting tools mounted on the turret.

Referring more particularly to the drawings, the machine comprises a frame 10 formed on the top with parallel spaced ways 11 supporting a slide 12. A hollow cylindrical turret 13 is mounted for rotation and axial reciprocation in a split guide sleeve or bearing 14 forming part of a turret housing 15 rigid with the slide 12. The outer end portion of the housing 15 is closed at the top by a cover 16, and is adapted to receive the drive end of the turret 13 projecting inwardly from the guide sleeve 14.

Both ends of the turret 13 are closed, the outer end wall 17 having an axial opening 18 normally closed by a removable plate 19 and through which access to the interior may be had, and the inner end wall 20 having an axial internal bearing sleeve 21. Formed in the forward end of the turret 13 are a plurality of parallel soskets or holes 22 located in uniformly spaced relation about the axis of rotation, and adapted to receive and support the shanks or spindles of a plurality of cutting tools. These holes are defined by tubular enlargements formed on the inner periphery of the turret 13, and open to the outer end face of the wall 17. It will be understood that any suitable number of tool holes 22 may be provided, and in the present instance six are shown. Any number of tools up to six and of different types as required by the number, sequence and nature of the machine operations to be performed on different kinds of work pieces may be mounted on the turret 13.

The turret 13 has an axial tubular drive shaft 23, the inner end of which extends through the sleeve 21 and is secured thereto by a longitudinal key 24, and the outer end of which extends through the housing 15 into a tubular housing extension 25. Consequently, the drive shaft is connected to the turret 13 for joint rotation and axial movement. Splined to the outer end portion of the turret shaft 23 for relative axial sliding movement is a bearing sleeve 26. This sleeve is rotatably confined against endwise movement in a bearing 27 integral with a vertical bracket 28 on the turret slide 12. One end of the sleeve 26 is formed with a peripheral flange 29, and the other end has a reduced threaded extension 30 defining a shoulder 31. A spur gear 32 is positioned on the sleeve 26 between the bearing 27 and the flange 29, and is rigidly connected to the latter. Threaded onto the extension 30 of the sleeve 26 against the shoulder 31 is a nut 33. The gear 32 and the nut 33 are in rotary bearing engagement with the opposite end faces of the sleeve 27, and serve to maintain the sleeve in axial position. Consequently, the turret 13 is adapted to be rotated by the gear 32, and is free to reciprocate axially. Rigidly secured to the end of the turret 13 about the shaft 23 is a plate 34 having an annular flange 34a adapted to enter loosely into an annular groove 33a in the adjacent face of the nut 33. The groove 33a and the flange 34a constitute a dashpot for damping the end of the return movement of the turret 13 into retracted position.

The means for reciprocating the turret 13 comprises a hollow cam drum 35 mounted for rotation on a parallel axis within the frame 10. In its preferred form, the cam drum 35 is supported at its ends for rotation in depending bearing brackets 36 on the slide 12, and is provided with a continuous peripheral cam groove 37 of suitable configuration. Mounted on the periphery of the turret 13 and corresponding in number and spacing to the holes 22 are a plurality of cam rollers 38 adapted for successive engagement with the cam groove 37. The groove (see Fig. 4) has one section 39 with a lead adapted through engagement with any one of the rollers 38 to move the turret 13 in an advance stroke, another section 40 having a reverse lead for retracting the turret in a return stroke, and a peripheral dwell section 41 for maintaining the turret in retracted position. In this position, the turret 13 is adapted to be indexed, and in the course of each indexing movement one roller 38 will leave the cam groove 37 and the succeeding roller will enter the groove. By reason of the dashpot 33ª, 34ª, heavy impact of the rollers 38 against the dwell end 41 of the cam groove 37 is prevented. Secured within the cam drum 35 is an internal gear 42 which meshes with a pinion 43 fixed on a sleeve shaft 44 journaled on a cam shaft 44ª extending eccentrically through the drum. The tubular shaft 44 is connected through a worm and worm gear drive 45 to a suitable source of power (not shown).

The gear 32 is adapted to be rotated periodically through a predetermined degree, by an intermittent motion device 46 operable by the cam drum 35, to index the tool turret 13 once for each revolution of the drum and hence after each cycle of tool reciprocation. The turret 13 is indexed in each step through the angular distance between consecutive tool holes 22 to locate the holes successively in the working station. In the present instance, the intermittent motion device 46 is of the Geneva type, comprising a star wheel 47 having a plurality of uniformly peripherally spaced arms, for example, three, formed in one side respectively with open-ended slots or grooves 48. The wheel 47 is fixed on one end of a stub shaft 49 journaled in the bearing bracket 28. A gear 50 secured by a key and nut arrangement 51 to the other end of the shaft 49 meshes with the gear 32 to complete the drive relationship to the turret 13. The cam drum 35, which constitutes the driver, carries a roller 52, on one end face adjacent the periphery, which is arranged to engage one of the slots 48, and thereby to rotate the wheel 47 through one-third revolution each time the cam drum makes a complete revolution. The angular phase relation between the cam groove 37 and the roller 52 about the axis of the drum 35 is such that the turret 13 will be indexed while in retracted or inoperative position. Hence, the dwell portion 41 of the cam groove 37 is in engagement with the operative index roller 38 on the turret 13, and positioned to receive the next succeeding roller.

The turret 13 may be indexed a number of times between successive cutting cycles to skip any one or more tools or tool holes 22 not required in a particular machining operation. This is accomplished by retracting the associated index roller or rollers 38 out of the range of the cam groove 37. In the present instance, each roller 38 is mounted on a pin 53 slidable in a radial bore 54 in the turret 13. A set screw 54ª, threaded through the end wall 20 of the turret 13, engages in a helical spline groove 53ª of a comparatively long lead formed in the periphery of the pin 53. The groove 53ª is of the exact length required for the axial range of movement of the pin 53, and preferably is formed at the very ends with locating recesses 53ᵇ adapted selectively to receive the end of the screw 54ª. The roller 38 can be caused to recede into or project from the bore 54 merely by loosening the screw 54ª, then turning the pin 53 through the range of the groove 53ª, and then retightening the screw. Assuming that one of the rollers 38 is retracted, this roller, when indexed into registration with the cam groove 37, will not establish a driving connection between the turret 13 and the cam drum 35. Consequently, the cam drum will rotate through one revolution without causing reciprocation of the turret. Normal operation will be resumed after the second indexing movement.

The specific turret indexing mechanism is being covered in my copending divisional application Serial No. 461,570, filed October 10, 1942.

Rotation of both the work and the tool is desirable in high speed drilling operations. In the present instance, means is provided for establishing a rotary drive from an individual motor 55 through the turret shaft 23 and turret 13 to a drill spindle mounted in one of the holes 22. This means comprises a tubular shaft 56 extending axially through and rotatable in the turret shaft 23. A coupling sleeve 57 with internal axial splines is rigidly secured to the outer end of the shaft 56, and is seated for rotary bearing engagement in a counterbore 58 in the outer end of the shaft 23. Extending through the coupling sleeve 57 in driving engagement therewith and into the shaft 56 for relative axial reciprocation is a splined drive shaft 59. This shaft projects from the casing extension 25 through a central opening 60, and is journaled in and extends through a bearing 61 on a bracket 62 supporting the motor 55 and mounted on the outer end of the slide 12. A gear 64 is keyed to the outer end of the shaft 59, and is connected through an adjustable idler gear 65 to a gear 66 on the shaft of the motor 55. The gears 64, 65 and 66 are suitably enclosed by a housing 67 on the bracket 62. Thus, the motor 55 is connected to drive the shaft 56 entering the turret 13 in all positions of axial movement of the latter.

The inner end of the shaft 56 is adapted to be connected through speed change gearing 68 to a rotary tool spindle 69. To this end, a central pinion 70 is threaded onto the inner end of the shaft 56. The pinion has an axial hub 71 engaging a shoulder 72 on the shaft 56, and is spaced from the inner end of the turret shaft 23 by an interposed bearing washer 73. It will be seen that the spline coupling sleeve 57 and the pinion 70 serve to confine the shaft 56 against axial movement in the turret shaft 23.

A bracket or carrier disk 74 is keyed to the inner end of the turret shaft 23, and is secured in position against the inner end of the shaft supporting sleeve 21 by a nut 75. Hence, the disk 74 and the shaft shoulder 76 engaging the opposite end of the sleeve serve to anchor the turret shaft 23 against endwise movement relative to the turret 13. Cluster gears 77 and 78 are freely rotatable as a unit on a bushing 79 carried by the disk 74. Preferably, the bushing 79 is secured in fixed position on the shank of a bolt 80 threaded into an eccentric boss 81 on the face of the disk 74. The innermost gear 77 meshes with the pinion 70 and the other gear 78 meshes with a pinion 82 for driving the associated rotary spindle 69.

The spindle gear or pinion 82 is fixed on the inner end of a tubular internal spline shaft 83 which is journaled in a bearing sleeve 84 removably secured in the inner end of the hole 22 by means of a set screw 85. The spindle 69 forms part of a self-contained spindle unit or structure 86 removably inserted into the outer end of the hole 22, and secured in position by a suitable clamp 87. The spindle unit 86 has an inwardly extending axial drive shaft 88 which is externally splined and extends into the shaft 83 to complete the spindle drive connection. By reason of the telescoped arrangement between the shafts 83 and 88, the spindle unit 86 may be secured in different axial positions as required by the particular depth of hole to be drilled.

A modified form of drive for a plurality of rotary spindles 69, for example, two or four spindles, is illustrated in Fig. 5. In this form, the bracket or carrier disk 74 of Fig. 3 is replaced by a disk 89 having two spaced eccentric mounting bosses 90 and 91. Each of the spindles 69 has a drive pinion 82. The cluster of gears 77 and 78 of Fig. 3 is replaced by two single gears 92 and 93 removably mounted respectively on the bosses 90 and 91 and meshing with the central pinion 70. The one gear 92 is disposed between and meshes at opposite sides with the pinions 82 for two adjacent spindles 69. When four rotary spindles 69 are provided, the gear 93 is similarly arranged to mesh with the pinions 82 of the two additional spindles. Thus, two or four spindles 69 may be driven from the gearing which is fully enclosed within the turret 13, and to which access may be had for purposes of selective adjustment through the opening 18 in the forward end of the turret.

I claim as my invention:

1. In a machine tool, in combination, a support, a hollow turret mounted on said support for rotary movement and for axial reciprocation and having a plurality of parallel spindle holes opening to one end and annularly arranged in uniformly spaced relation about the axis of rotation, means for rotating said turret to index said holes successively into a working station, a plurality of rotary spindles respectively mounted in certain of said holes, a power drive shaft extending axially into the other end of said turret, gear means mounted entirely within said turret for establishing a drive connection between said shaft and said spindles, said gear means including a train of speed change gears, and a removable closure in said one end of said turret for affording access to said speed change gears.

2. In a machine tool, in combination, a support, a hollow turret mounted on said support for rotary indexing movements and for axial reciprocation, and having a plurality of parallel spindle holes opening to one end and annularly arranged in uniformly spaced relation about the axis of rotation of said turret, an axial tubular index shaft fixed to said turret and opening through and projecting from the other end of said turret, means for reciprocating said turret, means for rotating said index shaft to index said holes successively into a working station, a second shaft extending coaxially through and rotatably anchored in said index shaft, a drive shaft journaled on said support and extending axially into slidable spline engagement with the outer end of said second shaft so as to establish a drive connection therewith in all axial positions of reciprocation of said turret, a drive motor on said support, speed change gearing connecting said motor to said drive shaft, a rotary spindle unit mounted in one of said holes and having a coaxial drive pinion, and a train of gears mounted within said turret for driving said spindle and including one terminal gear fixed on the inner end of said second shaft and another terminal gear meshing with said pinion.

3. In a machine tool, in combination, a support, a hollow turret mounted on said support for rotary indexing movements and for axial reciprocation, and having a plurality of parallel spindle holes opening to one end and annularly arranged in uniformly spaced relation about the axis of rotation of said turret, an axial tubular index shaft fixed to said turret and opening through and projecting from the other end of said turret, means for reciprocating said turret, means for rotating said index shaft to index said holes successively into a working station, a second shaft extending coaxially through and rotatably anchored in said index shaft, a drive shaft journaled on said support and extending axially into slidable spline engagement with the outer end of said second shaft so as to establish a drive connection therewith in all axial positions of reciprocation of said turret, a drive motor on said support, speed change gearing connecting said motor to said drive shaft, a plurality of rotary spindles mounted in said holes and connected at their inner ends to coaxial drive pinions, and a train of gears mounted within said turret for driving said spindles and including one terminal gear fixed on the inner end of said second shaft and a plurality of terminal gears meshing respectively with said pinions.

4. In a machine tool, in combination, a support, a hollow turret mounted on said support for rotary movement and for axial reciprocation and having a plurality of parallel sockets opening to one end and annularly arranged in uniformly spaced relation about the axis of rotation, means for rotating said turret to index said sockets successively into a working station, a rotary spindle unit mounted in one of said sockets for selective longitudinal adjustment, and supporting a spindle, a sleeve journaled in said socket in axial splined engagement with the inner end of said spindle, a power drive shaft extending axially into said turret, and gear means mounted entirely within said turret for establishing a drive connection between said shaft and said sleeve.

5. In a machine tool, in combination, a support, a hollow rotary turret mounted on said support for axial reciprocation and having a longitudinal tool hole opening eccentrically to one end, means for reciprocating said turret, a shaft extending axially into said turret and movable therewith, means for driving said shaft in all positions of reciprocation of said turret, a rotary spindle unit removably secured in and projecting from the outer end of said hole and having a spindle shaft, an intermediate shaft removably secured in the inner end of said hole and having an axially separable drive connection with said spindle shaft, a pinion on said intermediate shaft, a pinion on the inner end of said first mentioned shaft, a bracket secured to said turret for rotation therewith and having an eccentric boss, and a cluster of gears removably mounted for rotation on said boss and establishing a drive connection between said pinions.

6. In a machine tool, in combination, a support, a hollow rotary turret mounted on said support and having a tool hole opening thereto, a drive shaft extending axially into said turret, means for driving said shaft, a rotary spindle unit removably secured in and projecting from the outer end of said hole and having a spindle shaft, an intermediate shaft removably secured in the inner end of said hole and having a separable drive connection with said spindle shaft, a pinion on said intermediate shaft, a pinion on the inner end of said first mentioned shaft, a bracket secured to said turret for rotation therewith and having an eccentric boss, and gear means removably mounted on said boss and establishing a drive connection between said pinions.

7. In a machine tool, in combination, a support, a hollow rotary turret mounted on said support and having two parallel tool holes opening thereto, a drive shaft extending axially into said turret, means for driving said shaft, two rotary spindle units respectively removably secured in and projecting from the outer ends of said holes and each having a spindle shaft, an intermediate shaft removably secured in the inner end of each hole and having a separable drive connection with the associated spindle shaft, a pinion on each intermediate shaft, a pinion on the inner end of said first mentioned shaft, a bracket secured to said turret for rotation therewith, and a gear removably mounted for rotation on said bracket and establishing drive connections from the pinion on said drive shaft to said pinions on said intermediate shaft.

HARRY W. RUPPEL.